United States Patent Office 3,052,967
Patented Sept. 11, 1962

3,052,967
POROUS METALLIC MATERIAL AND METHOD
George Wesley Fischer, Cincinnati, Ohio, assignor to General Electric Company, a corporation of New York
No Drawing. Filed Sept. 14, 1959, Ser. No. 839,571
8 Claims. (Cl. 29—182)

This invention relates to a porous metallic material of controllable uniform porosity and density and to a method for making same.

Porous metals or metals including intentional cavities, pores or voids made by methods prior to this invention do not possess the uniformity of porosity and density required in many of today's applications. From uses such as in closely balanced seals for power producing apparatus to uses in chemical processes involving control of fluid flow, more rigid requirements are being specified for porous metal than could be satisfied prior to this invention.

A principal object of this invention is to provide a porous metallic material the density and porosity of which can accurately be controlled and varied through a method employing hollow organic particles.

An additional object is to provide a porous metallic material having a density substantially less than a solid metal of the same composition and volume yet having at least the same chemical properties and advantages.

Another object is to provide an improved method for making such a porous material.

A further object is to provide an improved method for producing a uniformly porous metallic material of accurately controlled chemical analysis in order to inhibit the introduction of significant amounts of contaminating matter into the metallic matrix.

Briefly, the method of this invention in one form comprises size classifying according to the porosity desired in a final product a quantity of hollow organic particles, blending the particles with a metallic powder, mixing the metal powder-particle blend with a hardenable organic binder, curing the mix into a form or shape, heating the shape to decompose and then to oxidize the organic materials, and then additionally heat treating to further bond the metallic powders together.

Through the use of decomposable hollow particles the decomposition products of which can be removed in the practice of this method, there results a porous metal product of accurately predictable and controllable density and porosity commensurate with the degree of classification of the hollow particles and their volume relationship to the metal powder and binder.

The details and significance of this invention as well as other objects and advantages will be better understood by reference to the following detailed description and examples which are presented for illustration and not limitation on this invention.

In the preparation of the porous metallic materials of this invention, it has been found best to mix together dry metallic powders and dry hollow organic particles prior to introducing such dry ingredients into a liquid resin or mixture of resins which subsequently act as a binder for the dry mix. However, if such binder resins are initially in dry rather than liquid form, a mixture of all such dry materials can be made.

The final product of this invention consists essentially of sintered metal powder with substantially no residue products from the organic components of the original mixture.

In the practice of the method of this invention, it is preferred that a fine metallic powder such as of about —325 mesh size comprising about 20–95% by weight of the total mixture be blended with about 1–25% by weight of hollow organic particles of generally spherical shape sometimes called "microspheres" which have been previously classified according to size by standard particle classifying means such as screens, air classifiers, etc.

After the two dry materials have been thoroughly intermixed, it is preferred that they be added to a hardenable organic binder resin or mixture of resins which comprises about 5–55% by weight of the total mix.

The resulting mixture of metal powder, microspheres and binder is then placed in a confining container such as a mold and cured. Some binder materials require heating to cure such as within the temperature range of 250–500° F. for at least about 10 minutes. Others will air harden or can be catalyzed to harden at room temperatures. After an initial cure has taken place, the material sometimes referred to as "green" material is then presintered or preliminarily bonded by heating to decompose the organic microspheres and organic binding resins within the temperature range of about 850–1200° F. Usually at least 40 minutes is required. If the type of metal powder used requires that the decomposition heating step be conducted in a non-oxidizing atmosphere such as a vacuum or a reducing atmosphere, an additional heat treatment in an oxidizing atmosphere such as air between 700–1500° F. is necessary to remove the carbon deposits or residues remaining from the decomposition of the organic ingredients.

The foam material is then heated at a relatively high temperature generally for at least about 40 minutes and preferably in a vacuum or reducing atmosphere to a temperature sufficient to sinter and to further bond the metallic powder or powders. Thus there can be formed a controlled density metallic product. The only limitations on the type of metallic powders which can be used in the method and product of this invention are that the melting point of the metal be at least about 50° F. above the decomposition temperature of the organic ingredients used. Therefore, refractory metals such as tungsten, molybdenum, columbium and their alloys can be incorporated as metallic powders in the method and product of this invention. In such cases the maximum sintering temperature of the powders is about 50° F. below the melting point of such metals or alloys. In addition, lower melting metallic powders can be included in a metallic powder mix to allow liquid phase sintering techniques to be used to bind the powders together as well as to afford a means, when desired, to make controlled chemistry alloys through mixtures of elemental or alloy powders.

The examples of the following Table I are representative of the tests performed to evaluate and determine some ranges of the method and product of this invention. In Table I, the column "percent density" is based on solid metal of the same composition and volume as 100% density.

*Table I*

| Example | Percent Density | Type Metal Powder | Percent by Weight | | | |
|---|---|---|---|---|---|---|
| | | | Metal Powder | Phenolic Microspheres | Acrylic Resin (20% Solids) | Phenolic Resin |
| 1 | 15 | Ni | 53.3 | 14.7 | 24.0 | 8.0 |
| 2 | 18 | Ni | 58.0 | 13.0 | 21.7 | 7.3 |
| 3 | 20 | Ni | 60.7 | 12.2 | 20.3 | 6.8 |
| 4 | 25 | Ni | 66.8 | 10.0 | 17.4 | 5.8 |
| 5 | 50 | Ni | 80.0 | 5.6 | 10.8 | 3.6 |
| 6 | 85 | Ni | 87.8 | 2.9 | 7.0 | 2.3 |
| 7 | 15 | Au | 74.6 | 7.9 | 13.1 | 4.4 |
| 8 | 85 | Au | 94.1 | 1.4 | 3.4 | 1.1 |
| 9 | 15 | Mg | 21.6 | 24.3 | 40.6 | 13.5 |
| 10 | 85 | Mg | 63.2 | 8.7 | 21.0 | 7.1 |

In the Examples 1–10 of Table I the hollow microspheres used were made from phenolic resin and had a diameter of about 5–20 microns. The binder resins in those examples were a combination of 20% solids solution of acrylic resin in toluol and a liquid phenolic resin of the Novolac type.

The procedure used in the preparation of the porous metals of Examples 1–6 are as follows; the method for Examples 7–10 and other metals as discussed herein differ only in the temperature and times of heating as indicated by representative examples in Table II herein.

The quantities of the materials selected for use in this method vary proportionately according to the size of mold desired to be filled to form a shape. The nickel powder and hollow phenolic microspheres were blended in a shell binder for about 30 minutes to assure adequate distribution of the heavier metal powder throughout the microspheres. The acrylic resin solution was mechanically mixed with the phenolic resin until a thick creamy colored mixture of the two was formed.

After such separate blending and mixing steps were complete, the dry ingredient blend was slowly mixed with the liquid resin mixture. After all the dry ingredients were added, the mixing was continued until a sticky, slightly moist paste formed. The moist paste was then placed in a mold shell that had been coated with a suitable parting agent, such as silicone grease. The paste was packed tightly into the mold to make sure that the corners were well filled. The mold was then covered and placed in a heated press at about 350° F. where it was held for about 1 hour. The mold was then cooled before removing from the press. The application of heat in this, the curing step of the process, caused the paste to solidify into a rigid form.

The "green" form, which at this point can be brittle, was prepared for presintering by smoothing all surfaces and slightly rounding all edges.

The "green" form was placed in a furnace and heated slowly to within the range of 900–1100° F., where it was held for about 1 hour to decompose the organic ingredients.

After completion of the organic decomposition, the molded piece was then heated to a temperature of about 2200° F. for about 1½ hours. It was then removed and placed in a furnace with an oxidizing (air) atmosphere at about 1200° F. for a time sufficient to convert carbon to one of its gaseous compounds such as carbon dioxide gas. In the case of nickel the time period is about 60 minutes; however, in the case of other materials this carbon "burn off" step can be within the range of about 5 minutes to 5 hours. After the carbon residue was removed, there remained a substantially pure metallic material having pores or voids incorporated therein of a uniform size commensurate with the original size of the microspheres and amount of resin which had been decomposed.

The carbon-free molded piece was then placed into a hydrogen furnace for final sintering at about 2200–2450° F. for about an hour and a half after which it was cooled in hydrogen before removing to the atmosphere. The final sintering step improved the bond strength and the ductility of the final product.

If desired, rather than varying the compositions of the various materials as listed in Table I, a product such as in Example 2 resulting in a density of 18% of the density (approximately 0.058 pound per cubic inch) of solid nickel of the same volume, can be sized and pressed to any desired density above 18%. In such a case the uniformity of porosity is maintained with only the size or shape of openings being changed.

The following Table II represents the heat treatment cycle found to be useful in connection with the various materials listed therein. The organic material decomposition step for all of the materials listed in Table II include a temperature of 900–1100° F. for 1 hour:

*Table II*

| Powdered Material | Presinter, Temp. (° F.) for 1 hour | Oxidation, Temp. (° F.) for 1 hour | Sinter Temp. (° F.) | Sinter Time (hrs.) |
|---|---|---|---|---|
| Al | 1,100 | 900 | 1,100 | 1.5 |
| Cu | 1,850 | 1,100 | 1,850 | 1.5 |
| Au | 1,800 | 1,100 | 1,800 | 1.5 |
| Fe | 2,000 | 1,200 | 2,350 | 1.5 |
| Mg | 1,100 | 900 | 1,100 | 1.5 |
| Ni | 2,200 | 1,200 | 2,450 | 1.5 |
| Pt | 2,250 | 1,200 | 3,000 | 1.5 |
| Ag | 1,600 | 1,000 | 1,600 | 1.5 |
| 95 Cu–5 Sn | 1,550 | 1,000 | 1,550 | 1.5 |
| 80 Cu–20 Sn | 1,400 | 1,000 | 1,400 | 1.5 |
| 90 Cu–10 Zn | 1,800 | 1,100 | 1,800 | 1.5 |
| 80 Cu–20 Zn | 1,700 | 1,100 | 1,700 | 1.5 |
| 90 Cu–5 Sn–5 Zn | 1,800 | 1,100 | 1,800 | 1.5 |
| 70 Cu–10 Sn–20 Zn | 1,300 | 900 | 1,300 | 1.5 |
| 70 Cu–20 Sn–10 Zn | 1,400 | 1,000 | 1,400 | 1.5 |
| 50 Ni–50 Al | 2,250 | 1,200 | 2,300 | 3 |
| 75 Ni–25 Al | 2,250 | 1,200 | 2,700 | 3 |

Although the examples above show the binder resin to be a combination of phenolic and acrylic resins, it has been found that acrylic resin or phenolic resin alone can be used equally as well as the mixture of resins. In addition, other hardenable resins such as of the epoxy or silicone types can be used. In addition, microspheres of other organic materials can be substituted for the phenolic microspheres of the examples. When catalyzed resins having a relatively short "pot life" are substituted for the phenolic or acrylic resins of the examples, it must be kept in mind that after an accelerator or catalyst is introduced into the resin, the mixed material must be used within a relatively short time.

Thus, through the elimination of such constituents as blowing agents, chemical reactive materials to produce gases, air intermixed in the constituents, etc., this invention provides a uniformly porous material of easily controlled density.

Although this invention has been discussed in connection with specific examples including specific materials, it will be understood by those skilled in the art, the modifications and variations of which this invention is capable.

What I claim is:

1. A method for preparing a porous metal comprising: mixing size classified hollow organic particles with metallic powder and hardenable organic binder; curing the mix to produce a hardened form; heating the form in a non-oxidizing atmosphere to decompose the organic particles and the organic binder, said heating preliminarily bonding the metallic powder together through the products of decomposition; heating the form in an oxidizing atmosphere to oxidize and to remove the remaining products of decomposition; and then heating the form to a sintering temperature sufficient to bond the metallic powder together.

2. The method as described in claim 1 in which the mix comprises by weight 1–25% organic particles, 20–95% metallic powder, and 5–55% organic binder.

3. The method of claim 1 in which the organic binder is a phenolic resin.

4. The method as described in claim 1 in which the organic binder is a mixture of phenolic and acrylic resins.

5. A method for preparing a porous metal comprising: blending uniformly size classified hollow organic particles with a metallic powder; mixing that blend with a hardenable organic binder; curing the mix to produce a hardened form; heating the form in a non-oxidizing atmosphere to decompose the organic particles and binder and to preliminarily bond the metallic powder together; heating the form in an oxidizing atmosphere to remove from the form carbon residue remaining from the decomposition of the organic ingredients; and then heating the form at a sintering temperature which is no higher than about 50° F. below the melting point of the metallic powder to further bond together the metallic powder.

6. A porous metallic material of controlled porosity, substantially free of carbon reaction products of decomposition of organic materials, made by the process of claim 1 and having a density of about 15–85% of the solid metal of the same composition and volume.

7. A method for preparing a porous metal comprising: selecting hollow spherically shaped phenolic particles within the size range of about 5–20 microns diameter; blending 1–25% by weight of the particles with 20–95% by weight of a metallic powder; mixing the blend with 5–55% by weight of liquid hardenable organic binder; curing the mix to produce a hardened form; heating the form in a non-oxidizing atmosphere at about 850–1200° F. to decompose the organic particles and organic resin and to preliminarily bond the metallic powder together; heating the form in an oxidizing atmosphere between about 700–1500° F. to remove from the form carbon residue remaining from the decomposition of the organic ingredients; and then heating the form at a sintering temperature which is no higher than about 50° F. below the melting point of the metallic powder to further bond together the metallic powder.

8. The method of claim 5 in which the hardenable organic binder is a liquid.

References Cited in the file of this patent

UNITED STATES PATENTS

| | | |
|---|---|---|
| 1,988,861 | Thorausch | Jan. 22, 1935 |
| 2,593,943 | Wainer | Apr. 22, 1952 |
| 2,622,024 | Gurnick | Dec. 16, 1952 |
| 2,851,354 | Scanlan et al. | Sept. 9, 1958 |

FOREIGN PATENTS

| | | |
|---|---|---|
| 616,839 | Great Britain | Jan. 27, 1949 |